US008035050B1

(12) United States Patent
Hsu et al.

(10) Patent No.: US 8,035,050 B1
(45) Date of Patent: Oct. 11, 2011

(54) DEFORMABLE CAP FOR A COMPUTER POINTING DEVICE

(75) Inventors: Peter Y. Hsu, Austin, TX (US); Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,473

(22) Filed: Sep. 30, 1999

(51) Int. Cl.
*H01H 13/04* (2006.01)
(52) U.S. Cl. .......... 200/333; 200/6 A; 400/479; 463/36; 463/37; 463/38
(58) Field of Classification Search .................. 345/156, 345/157, 163, 167, 164, 166, 161; 200/333, 200/6 A; 400/479, 490, 491; 361/680; 463/36, 463/37, 38; 446/143
See application file for complete search history.

(56) References Cited

U.S. PATENT DOCUMENTS

| | | | |
|---|---|---|---|
| 5,694,123 A | 12/1997 | Selker et al. | 341/22 |
| 5,798,754 A | 8/1998 | Selker et al. | 345/161 |
| 5,870,082 A | 2/1999 | Selker et al. | 345/168 |
| 5,889,508 A | 3/1999 | Slotta | 345/161 |
| 5,914,702 A | 6/1999 | Derocher et al. | 345/157 |

*Primary Examiner* — Elvin Enad
*Assistant Examiner* — Jennifer A. Poker
(74) *Attorney, Agent, or Firm* — Daffer McDaniel; Conley Rose and Tayon

(57) ABSTRACT

A deformable cap for a computer pointing device is provided that may be particularly useful for miniature joystick-type pointing devices such as the TrackPoin™ and ScrollPoint™ devices manufactured by the IBM corporation of Armonk, N.Y. When an operator places a fingertip on the cap, the cap deforms thereby advantageously increasing the surface area of contact between the cap and the fingertip. All embodiments of the cap are placed on an upper portion of a control stick of the pointing device. A first embodiment of the cap includes a bottom support, a disc, a plurality of wire supports, and an elastic cover that overlays the disc and wire supports. An inner surface of the cover may be scored to ensure repeatable deformation of the cap. A spring may be attached to a lower surface of the disc to assist the cap in regaining its original shape once the operator's fingertip is removed. A second embodiment of the cap includes a bottom support, a plurality of wire supports, and an elastic cover overlaying the wire supports. An inner surface of the cover may be scored. The cap may be hollow or may be filled with a deformable material. A third embodiment of the cap includes a bottom support and an elastic cover in which an inner surface of the cover may be scored. The cap may be hollow or may be filled with a deformable material.

43 Claims, 5 Drawing Sheets

DEFORMABLE CAP FOR A COMPUTER POINTING DEVICE

BACKGROUND OF THE INVENTION

1. Field of the Invention

This invention relates to computer input devices and, more particularly, to a deformable cap for a computer pointing device.

2. Description of the Relevant Art

Modern computer systems that implement graphical user interfaces ("GUIs") typically include one or more pointing devices for the computer operator. Pointing devices typically allow an operator to move a cursor about the computer screen and to select objects. A commonly used pointing device is the computer mouse. Operation of the computer mouse typically requires a relatively large flat space. A variety of other pointing devices have been developed in an attempt to reduce the area occupied by the pointing device or required for use by the pointing device. A pervasive trend with notebook-style portable computers (also referred to as laptop computers) is attempting to reduce the size of every component of the computer while maintaining ease of use for the operator. Development of new pointing devices is, therefore, particularly important for portable computers. For instance, the computer mouse is difficult to use when not sitting at a desk. Additionally, pointing devices that utilize less area may be mounted directly on the portable computer.

One type of alternative computer pointing device is a miniature joystick-type pointing device that is often mounted within a keyboard. An example of a miniature joystick-type pointing device is the TrackPoint™ manufactured by the IBM Corporation of Armonk, N.Y. The TrackPoint™ includes a control stick placed within a keyboard, typically between the "G", "H", and "B" keys. The keyboard may be that of either a portable computer or a desktop computer. The top of the control stick is typically covered by a cap with a high-friction fuzzy surface. An operator applies a force to the control stick using a single finger. The bottom of the control stick is coupled to a sensor that detects any movement of the control stick. The sensor is located within the keyboard. The output of the sensor is typically adapted such that a force applied by an operator in a given direction on the control stick results in movement of a cursor on a computer monitor in the corresponding direction.

A similar miniature joystick-type pointing device is the ScrollPoint™ also manufactured by the IBM Corporation of Armonk, N.Y. The ScrollPoint™ includes a control stick covered by a cap of a high-friction fuzzy material and is mounted on a computer mouse between the two mouse buttons. The control stick is coupled to a sensor located within the computer mouse. An operator applies a force to the control stick using a fingertip and the direction of the force is detected by the sensor. The output of the sensor is typically adapted to control scroll bars located on a computer monitor.

Although miniature joystick-type pointing devices, such as the TrackPoint™ and ScrollPoint™, occupy a minimal amount of space and provide an intuitive interface for an operator to control a cursor or a scroll bar, utilization of the devices by an operator may sometimes prove difficult. Since the devices are made small enough to comfortably fit on a keyboard or mouse, the surface area of contact between the operator's finger and the cap of the control stick is small. Additionally, both the cap and the operator's finger have convex shapes that further reduce the contact surface area.

Although the cap placed on the control stick may be made of a high-friction fuzzy surface (i.e., a surface with a plurality of short fiber adhered to it outer surface), the operator may still be required to exert a relatively large force to keep his/her finger from slipping off the cap. First time users may experience difficulty exerting the correct force to keep their fingers from slipping. Additionally, after extended use of the pointing device, an operator may experience pain and soreness in his/her fingertip.

The high-friction fuzzy surface of the cap may become smooth after use thereby necessitating frequent replacement. As the surface of the cap becomes smooth, an operator will be required to exert even greater force to keep his/her finger from slipping. If the cap is not replaced once it becomes smooth, the operator may experience increased levels of discomfort in his/her fingertip.

It is therefore desired to develop an improvement to the miniature joystick-type pointing device that increases the comfort level of the operator using the device. New operators of the pointing device should be able to easily adapt to utilization of the device. Additionally, long-term use of the pointing device should not cause the operator to experience discomfort in his/her finger. It is also desired that the improvement may work with both new pointing devices and existing pointing devices already in use such as the TrackPoint™ and ScrollPoint™.

SUMMARY OF THE INVENTION

The problems outlined above are in large part addressed by a deformable cap for a miniature joystick-type computer pointing device. When an operator applies a finger to an upper surface of the cap, the cap deforms such that the surface area of contact between the cap and the operator's finger is increased. After the finger is removed from the cap, the original shape of the cap is recovered. Preferably, the operator's finger is only required to apply a weak force to deform the cap. Additionally, the cap may be made such that it has a concave shape when deformed that further increases the contact surface area. Increasing the surface area of contact between the cap and the operator's fingertip is believed to advantageously increase the friction between the cap and the operator's fingertip. The operator is therefore required to exert less force to keep his/her fingertip from slipping off the device. A first-time operator will experience less difficulty adapting to use of the pointing device. Additionally, long-term utilization of the pointing device is less likely to result in an operator experiencing discomfort in his/her fingertip.

Since the deformable cap has an increased contact surface area, a more durable material may be used for the cap even if that material does not provide as much friction between the cap and the operator's finger. The deformable cap therefore will require less frequent replacement. Additionally, the cap may be made such that it is easily applied to and removed from the control stick of the pointing device. The cap may also be made such that it may be used on new miniature joystick-type pointing devices and that it may also be fitted onto existing pointing devices.

At least three different embodiments of the deformable cap for a miniature joystick-type pointing device are contemplated herein. All embodiments of the deformable cap are such that cap is adapted to fit onto an upper portion of the control stick of the pointing device. An upper surface of the cap may extend above an upper surface of the control stick. For example, the height of the cap above an upper surface of the control stick is preferably as least equal to or greater than the diameter of the cap. When an operator applies a fingertip to the cap, the cap deforms and the radius of the contact surface area increases. For example, if the radius of the contact surface area increases by approximately a factor of two, the contact surface area increases by a factor of approximately twelve. If the pointing device is placed within a keyboard, the deformed cap may cover a portion of one or more keys of the keyboard when an operator's finger is on the cap; however, when the operator removes his/her finger from the cap, the elasticity of the cap returns the cap to its original shape and allows the operator unobstructed access to the keyboard. The cap is held onto the control stick by a combination of friction and gravity.

A first embodiment of the deformable cap includes a bottom support, a disc, wire supports attached to an outer surface of the disk, and an elastic cover that overlays the disc, the wire supports, and the bottom support. The bottom support may be positioned on an upper surface of the control stick and may be made from a hard plastic. The disc may be made from a hard plastic and may have a flat upper surface or, preferably, a concave upper surface. Each of the plurality of wire supports may include three wires encased in a flexible plastic or rubber sleeve such that the wires are laid end-to-end. The top two wires may be of approximately equal length or, to increase the concave shape of the deformed cap, the top most wire may be shorter than the middle wire. Holes may be located in an upper surface of the bottom support such that the each of the holes are adapted for receiving a portion of one of the wire supports that includes the bottom wire.

The elastic cover is made of a material such as plastic or rubber. The cover has a cylindrical shape with one end of the cover opened. A portion of the open end of the cover fits over an upper portion of the control stick. An inner surface of the elastic cover may be scored such that the deformation of the cap is more repeatable. One or more scores may be located along circumferences of the cylindrical inner surface of the cover. The scores are preferably located such that ends of the middle wire of each wire support are located adjacent to scores.

Additionally, the cap may also include a spring to aid in restoration of the cap's original shape after deformation. A first end of the spring is attached to a lower surface of the disc while the second end of the spring rest against an upper surface of the bottom support. The bottom support may include a depression to accommodate a portion of the spring. A depth of the depression may be such that it can accommodate the entire length of the compressed spring.

A second embodiment of the deformable cap includes a bottom support, an elastic cover, and wire supports located adjacent to an inner surface of the cover. The second embodiment is similar to the first embodiment except that the disc and spring are not present. The bottom support may be positioned on an upper surface of the control stick and may be made from a hard plastic. The cover and wire supports may be similar to those discussed above in regards to the first embodiment. Specifically, the cover has a cylindrical shape with one end of the cover opened. A portion of the opened end of the cover is adapted to fit over an upper portion of the control stick. One or more scores may be located on an inner surface of the cover. The cover may be made from either plastic or rubber. The wire supports may include three wires encased in a flexible plastic or rubber sleeve. Ends of the middle wire of each wire support are preferably located adjacent to the scores. A length of the top most wire may be approximately equal to or less than a length of the second wire. Holes may be located in an upper surface of the bottom support such that each hole is adapted for receiving a portion of one of the wire supports that includes the bottom wire. The interior of the cap may be hollow or may be filled with a deformable material. The deformable material may aid in restoring the shape of the cap after the operator removes his or her finger from the cap. Examples of suitable deformable material include soft foam rubber, putty, air, and gel.

A third embodiment of the deformable cap includes a bottom support and an elastic cover. The bottom support may be positioned on an upper surface of the control stick and may be made from a hard plastic. The cover may be similar to that discussed above in regards to either the first or second embodiment. Specifically, the cover may be constructed from either plastic or rubber. The cover has a cylindrical shape with one end opened. The open end of the cover may be adapted to fit over an upper portion of the control stick of the pointing device. One or more scores may be located on an inner surface of the cover. The scores are preferably located on circumferences of the cylindrical inner surface of the cover. The interior of the cap may be hollow or may be filled with a deformable material such as soft foam rubber, putty, air, or gel.

BRIEF DESCRIPTION OF THE DRAWINGS

Other objects and advantages of the invention will become apparent upon reading the following detailed description and upon reference to the accompanying drawings in which.

Figure 1A:
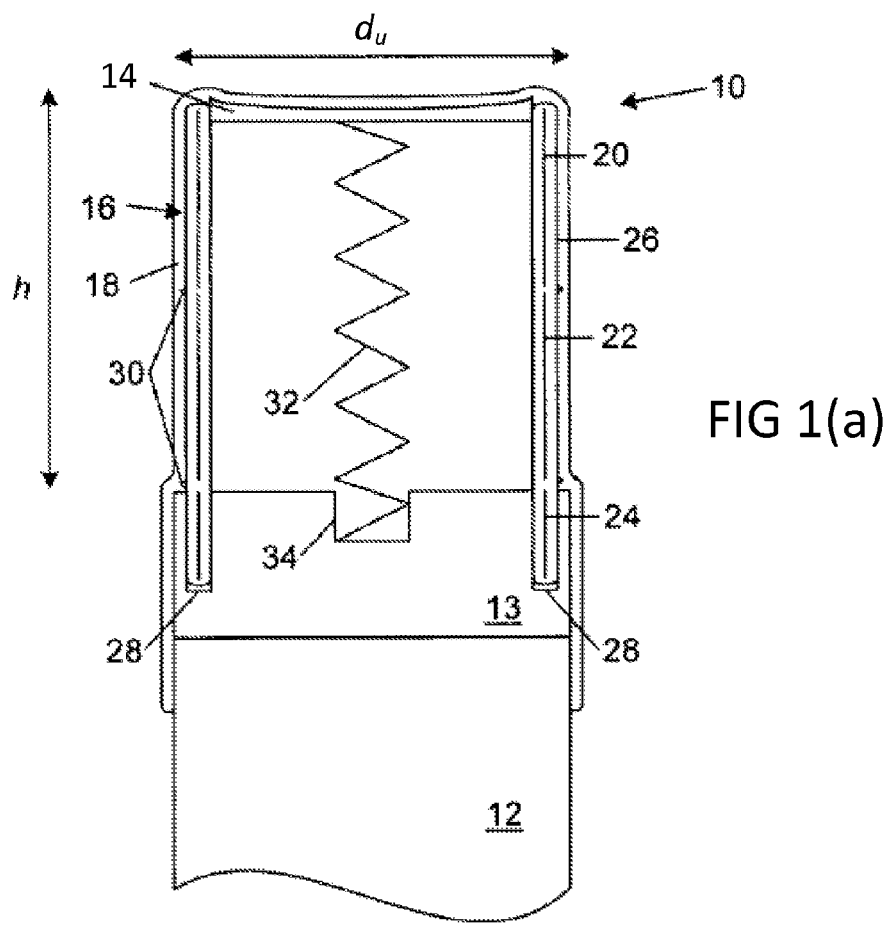
FIGS. 1(a) and (b) are cross-sectional side-view schematics of a deformable cap for a miniature joystick-type pointing device according to a first embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1B:
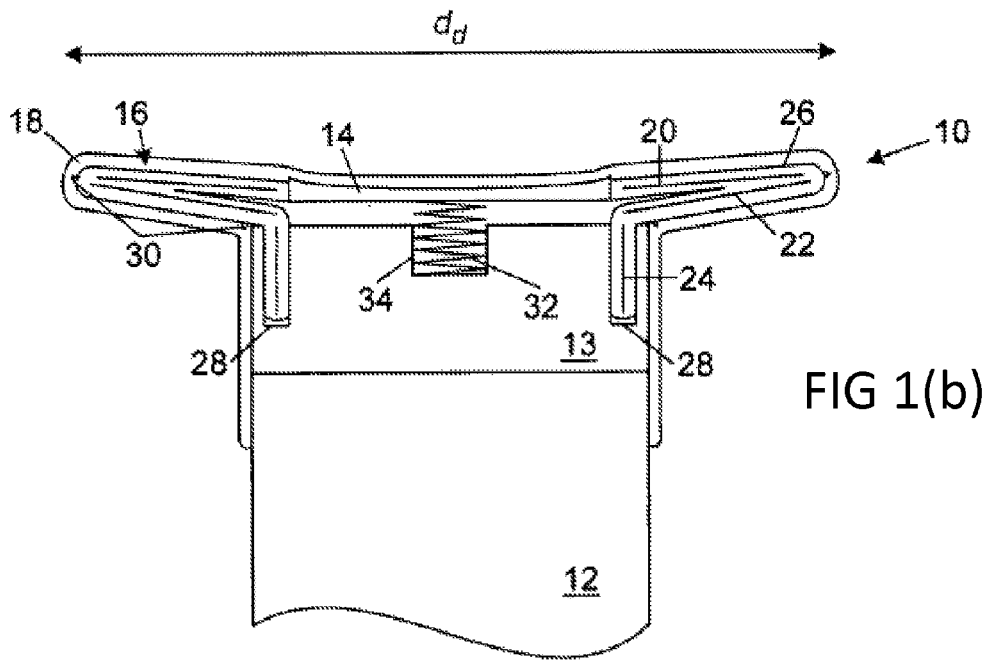

Turning now to the drawings, FIGS. 1(a) and (b) show cross-sectional side-view schematics of a deformable cap for a miniature joystick-type pointing device according to a first embodiment. FIG. 1(a) shows cap 10 in the undeformed state while FIG. 1(b) shows cap 10 in the deformed state. Cap 10 is placed on control stick 12 of a computer pointing device. Cap 10 includes bottom support 13, disc 14, wire supports 16, and elastic cover 18. Bottom support 13 is positioned on top of an upper surface of control stick 12. Bottom support 13 may be made of a rigid material such as hard plastic. An upper surface of disc 14 may be flat or, preferably, concave. A concave upper surface beneficially assists in increasing the surface area of contact between the cap and a operator's convex fingertip. Disc 14 may be made of a rigid material such as hard plastic. Each wire support 16 includes wires 20, 22, and 24 encased in flexible sleeve 26. Although three wires are shown for each wire support 16, less than or more than three wires may be used. For example, if only two wires, such as wires 20 and 22, are used, then wire 22 may be pivotally mounted to an upper surface of bottom support 13. Flexible sleeve 26 may be made of a material such as plastic or rubber. Holes 28 in the upper surface of bottom support 13 are adapted for receiving portions of wire supports 16 that include wire 24. A length of wire 20 may be approximately equal to or, preferably, less than a length of wire 22. For the size of disc 14 and bottom support 13 shown in FIGS. 1(a) and (b), if a length of wire 20 is less than a length of wire 22 this may help create a concave upper surface of cap 10 when deformed. For other geometries of cap 10, the lengths of wires 20 and 22 are preferably chosen such that a concave upper surface of cap 10 results when cap 10 is deformed.

Elastic cover 18 overlays disc 14, wire supports 16, bottom support 13, and an upper portion of control stick 12. Cover 18 may be made from plastic or rubber. Cover 18 is cylindrical in shape and the end of cover 18 fitted over control stick 12 is opened. Since the surface area of contact is greatly increased by cap 10, the outer surface of cover 18 may be made smooth to improve the long-term wear characteristics of cover 18. Scores 30 may be located on the inner surface of cover 18. Scores 30 may result in deformation of cap 10 being more repeatable. Scores 30 are preferably located along circumferences of the cylindrical inner surface of cover 18. Although two scores are shown there may be more than or less than two scores. Scores 30 are preferably located such that they are adjacent to ends of wire 22.

As an additional embodiment, spring 32 may be attached to a lower surface of disk 14. The other end of spring 32 may rest on an upper surface of bottom support 13 or a portion of spring 32 may be positioned within depression 34 located on the upper surface of bottom support 13. Depression 34 may be deep enough such that entire length of compressed spring 32 may be contained in depression 34.

FIG. 1(a) shows that the undeformed cap 10 has a diameter d, and extends a height h above the upper surface of bottom support 13. Height h is preferably approximately equal to or greater than diameter $d_u$. FIG. 1(b) shows that the deformed cap 10 has a diameter $d_d$ greater than $d_u$. For example, if diameter $d_d$ is at least twice as great as diameter $d_u$, the surface area of cap 10 when deformed is increased by at least a factor of twelve over the surface area of cap 10 when undeformed. The force required to be exerted by an operator's finger to deform cap 10 should be minimal. Additionally, once the operator's finger is removed, cap 10 should return to the undeformed state due to the elastic properties of cover 18, wire supports 16, and/or spring 32. Cap 10 is preferably retained on control stick 12 by a combination of friction and gravity although other methods may be used. Since cap 10 is held on simply by friction and gravity, installation and removal of cap 10 from control stick 12 may be accomplished quickly without the need of any tools.

Figure 2:
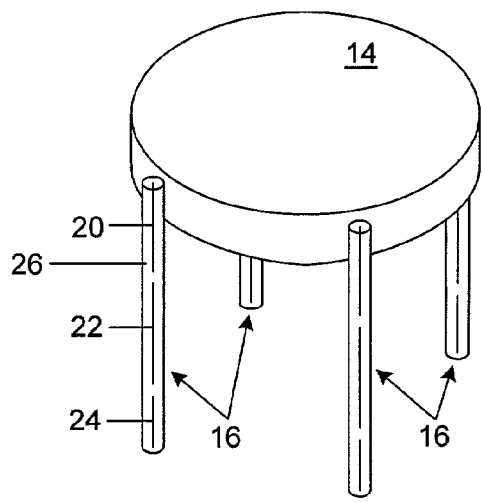
FIG. 2 is a perspective view of the disc and wire supports of the deformable cap.
Figure 3:
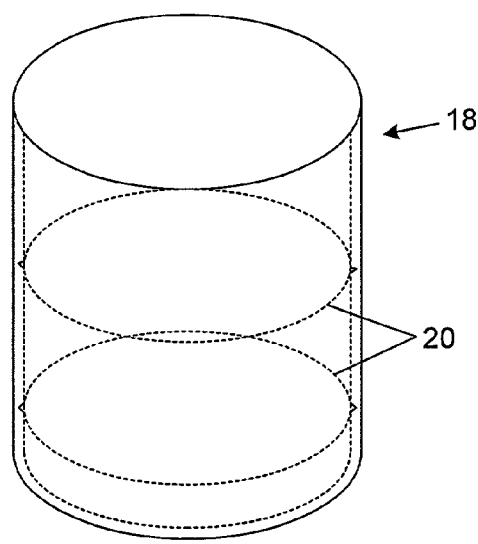
FIG. 3 is a perspective view of the elastic cover of the deformable cap.

FIG. 2 depicts a perspective view of the disc and wire supports of cap 10. Although four wire supports 16 are shown attached to the periphery of disc 10, there may be more or less than four wire supports 16. FIG. 3 illustrates a perspective view of the elastic cover of cap 10. Cover 18 is cylindrical in shape with one open end. Two scores 20 are shown in phantom on an inner surface of cover 18. Scores 20 are along circumferences of the cylindrical inner surface of cover 18.

Figure 4A:
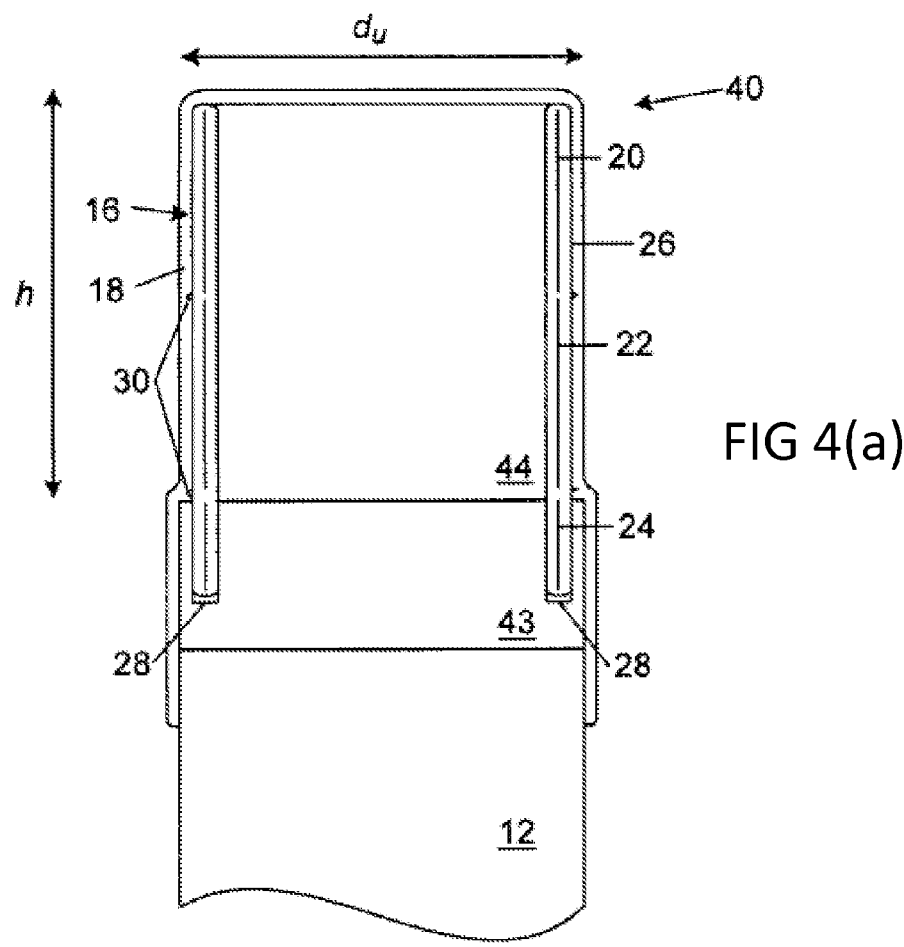
FIGS. 4(a) and (b) are cross-sectional side-view schematics of a deformable cap for a miniature joystick-type pointing device according to a second embodiment.
Figure 4B:
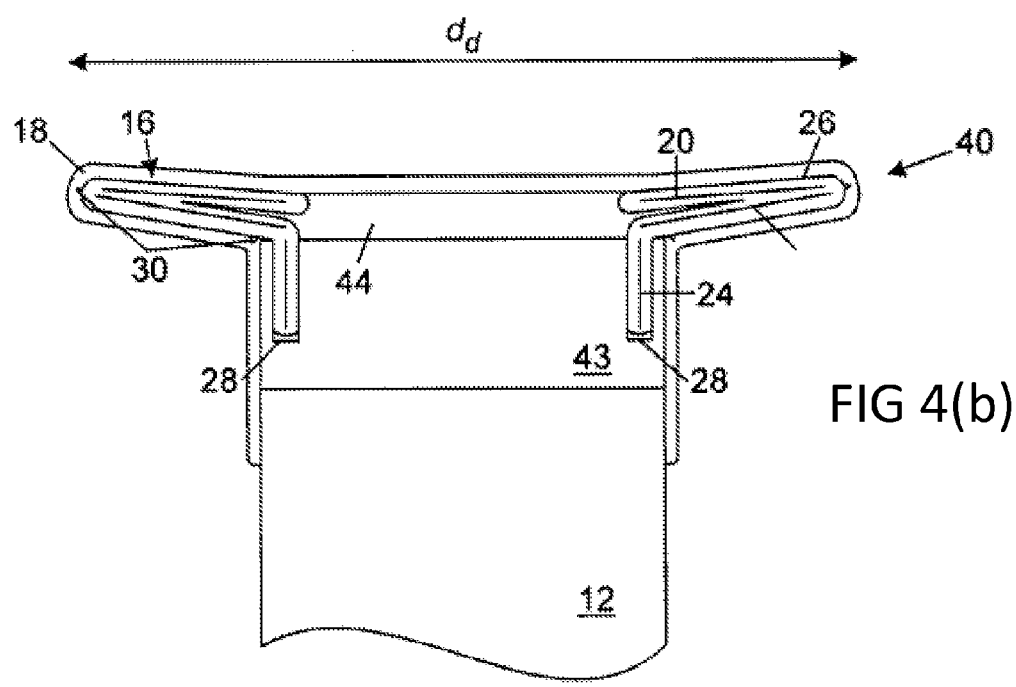

FIGS. 4(a) and (b) show cross-sectional side-view schematics of a deformable cap for a miniature joystick-type pointing device according to a second embodiment. FIG. 4(a) shows cap 40 in the undeformed state while FIG. 4(b) shows cap 40 in the deformed state. Portions of cap 40 similar to that of cap 10 of FIGS. 1(a) and (b) are labeled identically. The second embodiment shown in FIGS. 4(a) and (b) is similar to the first embodiment shown in FIGS. 1(a) and (b) except that disc 14 and spring 32 are not present; however, the second embodiment has the same functionality as the first embodiment. Cap 40 is placed on control stick 12 of a computer pointing device. Cap 40 includes bottom support 43, wire supports 16 and elastic cover 18. Bottom support 43 is positioned on top of an upper surface of control stick 12. Bottom support 43 may be made of a rigid material such as hard plastic. Although two wire supports are shown, cap 40 may include more than two wire supports. Each wire support 16 includes wires 20, 22, and 24 (although there may more or less wires) encased in flexible sleeve 26. A length of wire 20 may be approximately equal to or less than wire 22. Holes 28 in the upper surface of bottom support 43 are adapted for receiving portions of wire support 16 that includes wire 24.

Elastic cover 18 overlays wire supports 16, bottom support 43, and an upper portion of control stick 12. Cover 18 may be made from either plastic or rubber. Cover 18 is cylindrical in shape and the end of cover 18 fitted over control stick 12 is opened. A perspective view of cover 18 is depicted in FIG. 3. The outer surface of cover 18 may be made smooth. Scores 30 may be located on the inner surface of cover 18. There may be more than or less than the two scores shown on cover 18. Scores 18 are preferably adjacent to ends of wires 22. Interior 44 of cap 40 may be either hollow or filled with a deformable material. Examples of suitable deformable material include soft foam rubber, putty, air, and gel.

A height h of undeformed cap 40 is preferably approximately equal to or greater than a diameter $d_u$ of undeformed cap 40. Diameter $d_d$ of deformed cap 40 is greater than diameter $d_u$ and may be at least twice as great as diameter $d_u$. The force required to be exerted by an operator's finger should be minimal, and, once the operator's finger is removed, cap 40 should return to the undeformed state due to the elastic properties of cover 18 and/or wire supports 16. Cap 40 is preferably retained on control stick 12 by a combination of friction and gravity although other methods may be used.

Figure 5A:
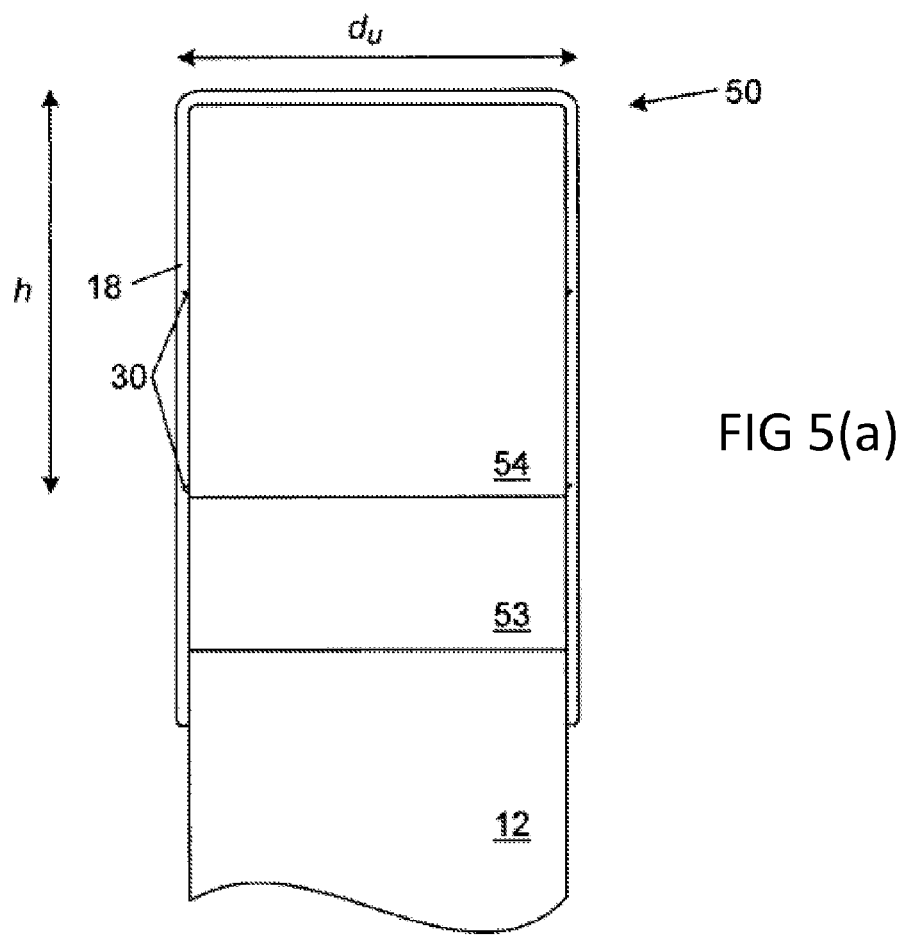
FIGS. 5(a) and (b) are cross-sectional side-view schematics of a deformable cap for a miniature joystick-type pointing device according to a third embodiment.
Figure 5B:
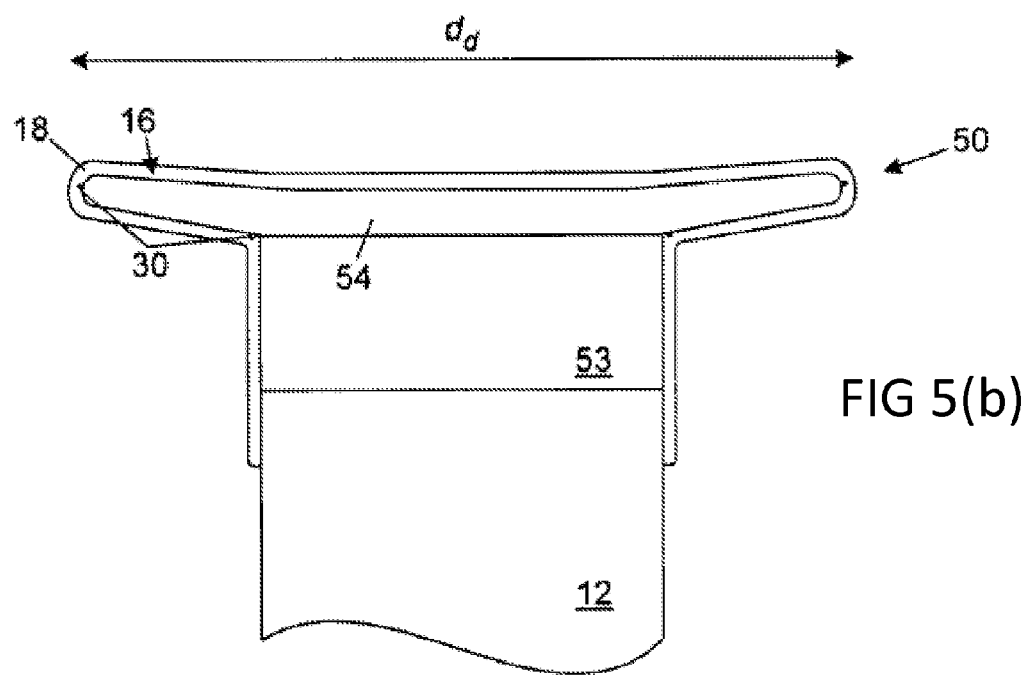

FIGS. 5(a) and (b) show cross-sectional side-view schematics of a deformable cap for a miniature joystick-type pointing device according to a third embodiment. FIG. 5(a) shows cap 50 in the undeformed state while FIG. 5(b) shows cap 50 in the deformed state. Portions of cap 50 identical to cap 10 of FIGS. 1(a) and (b) are labeled identically. Cap 50 is placed on control stick 12 of a computer pointing device. Cap 50 includes bottom support 53 and elastic cover 18. Bottom support 53 is positioned on top of an upper surface of control stick 12. Bottom support 53 may be made of a rigid material such as hard plastic. Cover 18 overlays bottom support 53 and an upper portion of control stick 12. Cover 18 may be made from either plastic or rubber. Cover 18 is cylindrical in shape and the end of cover 18 fitted over control stick 12 is opened. A perspective view of cover 18 is depicted in FIG. 3. The outer surface of cover 18 may be made smooth. Scores 30 may be located on the inner surface of cover 18. There may be more than or less than the two scores shown on cover 18. Interior 54 of cap 50 may be either hollow or filled with a deformable material. Examples of suitable deformable material include soft foam rubber, putty, air, and gel.

A height h of undeformed cap 50 is preferably approximately equal to or greater than a diameter $d_u$ of undeformed cap 50. Diameter $d_d$ of deformed cap 40 is greater than diameter $d_u$ and may be at least twice as great as diameter $d_u$. The force required to be exerted by an operator's finger should be minimal, and, once the operator's finger is removed, cap 50 should return to the undeformed state due to the elastic properties of cover 18 and/or the deformable material filling interior 54. Cap 50 is preferably retained on control stick 12 by a combination of friction and gravity although over methods may be used.

Figure 6:
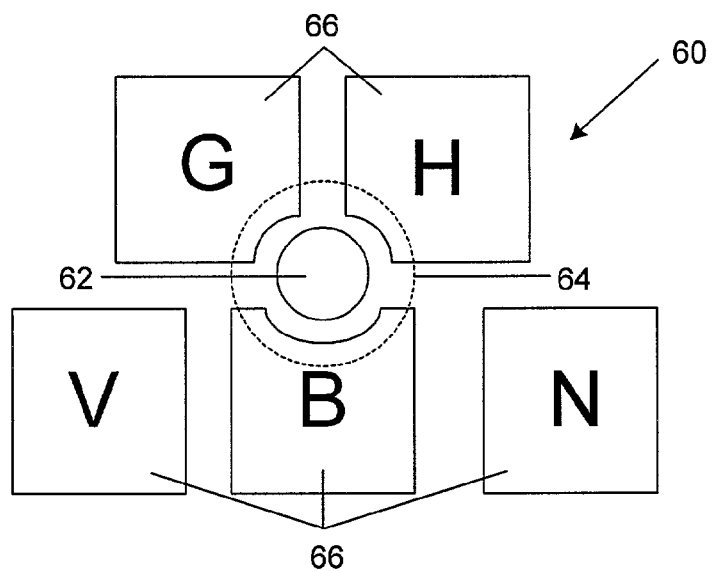
FIG. 6 is a top-view schematic of a portion of a computer keyboard employing a miniature joystick-type pointing device with a deformable cap.

FIG. 6 illustrates a top-view schematic of a portion of a computer keyboard employing a miniature joystick-type pointing device that includes a deformable cap as recited herein. Keyboard portion 60 is a portion of a standard "QWERTY" keyboard. Five keys 66 are shown in addition to pointing device 62 which has been added to the keyboard. Pointing device 62 includes a control stick and a deformable cap. Pointing device 62 is coupled to a sensor located within the keyboard. The sensor may be adapted for detecting movement of the control stick. Keyboard portion 60 may belong to either a keyboard integrated into a portable computer or may a stand-alone keyboard of a desktop computer. The keyboard may also be other than that of a standard "QWERTY" keyboard. Although pointing device 62 is shown placed between the "G", "H", and "B" keys, the pointing device could be placed elsewhere on the keyboard. Pointing device 62 is shown with the cap in the undeformed state. When an operator places a finger on pointing device 62, the deformed cap occupies an area 64 depicted in phantom. The deformed cap therefore partially overlaps the "G", "H", and "B" keys; however, when the operator removes his/her finger from pointing device 62, the cap returns to the undeformed state thereby allowing unobstructed access to keys 66. Pointing device 62 may be adapted to control the movement of a cursor about a computer monitor.

Figure 7:
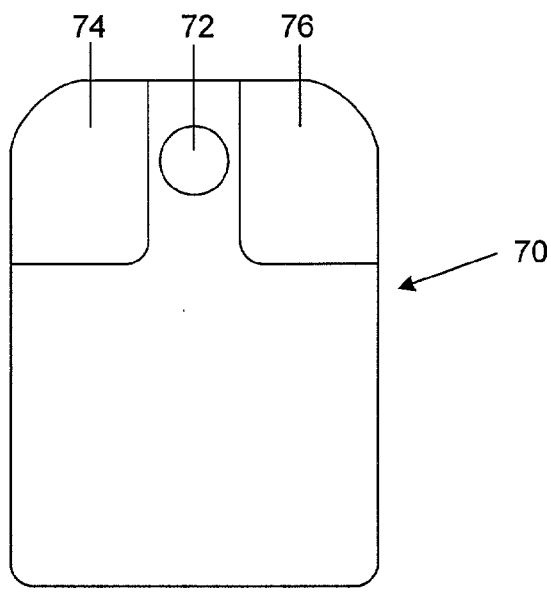
FIG. 7 is a top-view schematic of a computer mouse employing a miniature joystick-type pointing device with a deformable cap.

FIG. 7 depicts a top-view schematic of a computer mouse employing a miniature joystick-type pointing device that includes a deformable cap as recited herein. Computer mouse 70 includes mouse buttons 74 and 76. Between mouse buttons 74 and 76 is pointing device 72. Pointing device 72 includes a control stick and a deformable cap. Pointing device 72 is coupled to a sensor located within mouse 70. The sensor may be adapted for detecting movement of the control stick. Pointing device 72 may be adapted to control the scrollbars located on a computer monitor.

It will be appreciated by those skilled in the art having the benefit of this disclosure that this invention provides a deformable cap for a computer pointing device. Further modifications and alternative embodiments of various aspects of the invention will be apparent to those skilled in the art in view of this description. For example, the cap may be held onto the control stick of the computer pointing device by an adhesive. Additionally, each wire support may contain only a single wire that may scored at one or more locations along its length. It is intended that the following claims are interpreted to embrace all such modifications and changes and, accordingly, the specification and drawings are to be regarded in an illustrative rather than a restrictive sense.

What is claimed is:

1. A cap for a computer pointing device, comprising:
    a disc,
    a plurality of wire supports attached to a periphery of the disc;
    a bottom support upon which portions of the plurality of wire supports reside; and
    an elastic cover that overlays the disc, the plurality of wire supports, and the bottom support.

2. The cap of claim 1, wherein a height of the cap above an upper surface of the bottom support is approximately equal to or greater than a diameter of the cap.

3. The cap of claim 1, wherein an upper surface of the disc is concave.

4. The cap of claim 1, wherein the disc and the bottom support comprises a hard plastic.

5. The cap of claim 1, wherein each of the plurality of wire supports comprises a first wire, a second wire, and a third wire encased in a flexible sleeve, wherein a first end of the first wire is adjacent to the disc, a second end of the first wire is adjacent to a first end of the second wire, and a second end of the second wire is adjacent to a first end of the third wire.

6. The cap of claim 5, wherein the flexible sleeve comprises plastic or rubber.

7. The cap of claim 5, wherein the first and second wires are approximately equal in length.

8. The cap of claim 5, wherein the first wire is shorter than the second wire.

9. The cap of claim 5, wherein lengths of the first and second wires are such that the an upper surface of the cover exhibits a concave shape when deformed.

10. The cap of claim 5, wherein an upper surface of the bottom support comprises a plurality of holes, wherein each individual hole within the plurality of holes is adapted for receiving a portion of one of the plurality of wire supports that includes the third wire.

11. The cap of claim 1, wherein a shape of the cover is cylindrical, and wherein a first end of the cover is open.

12. The cap of claim 11, wherein an inner surface of the cover comprises one or more scores, and wherein each of the scores is located on a circumference of the cylindrical inner surface.

13. The cap of claim 1, wherein the cover comprises plastic or rubber.

14. The cap of claim 1, further comprising a spring attached to a lower surface of the disc.

15. The cap of claim 14, wherein an upper surface of the bottom support comprises a depression to accommodate a lower portion of the spring.

16. A cap for a computer pointing device, comprising:
    a bottom support;
    an elastic cover that overlays the bottom support, wherein the elastic cover has a cylindrical shape, and wherein a first end of the cover is open; and
    one or more scores located along a circumference of an inner surface of the cover.

17. The cap of claim 16, wherein a height of the cap above an upper surface of the bottom support is approximately equal to or greater than a diameter of the cap.

18. The cap of claim 16, further comprising the cover filled with a deformable material.

19. The cap of claim 18, wherein the material comprises soft foam rubber, putty, air, or gel.

20. The cap of claim 16, further comprising a plurality of wire supports located adjacent to the inner surface of the cover.

21. The cap of claim 20, wherein each of the plurality of wire supports comprises a first wire, a second wire, and a third wire encased in a flexible sleeve, wherein a first end of the first wire is adjacent to a second end of the cover, a second end of the first wire is adjacent to a first end of the second wire, and a second end of the second wire is adjacent to a first end of the third wire.

22. The cap of claim 21, wherein the first and second ends of the second wire are each located adjacent to one of the scores on the inner surface of the cover.

23. The cap of claim 21, wherein the first wire and second wires are approximately equal in length.

24. The cap of claim 21, wherein the first wire is shorter than the second wire.

25. The cap of claim 21, wherein lengths of the first and second wires are such that the an upper surface of the cover exhibits a concave shape when deformed.

26. The cap of claim 21, wherein an upper surface of the bottom support comprises a plurality of holes, wherein each individual hole within the plurality of holes is adapted for receiving a portion of one of the plurality of wire supports that includes the third wire.

27. The cap of claim 20, further comprising the cover filled with a deformable material.

28. The cap of claim 27, wherein the material comprises soft foam rubber, putty, air, or gel.

29. A computer pointing device, comprising:
a control stick; and
a cap, comprising:
 a bottom support, wherein the bottom support is positioned on an upper surface of the control stick; and
 an elastic cover with a cylindrical shape, wherein a first end of the cover is open and is fitted over the bottom support and an upper portion of the control stick, and wherein an inner surface of the cover comprises one or more scores located along circumferences of the inner surface.

30. The computer pointing device of claim 29, wherein a bottom portion of the control stick is coupled to a computer keyboard.

31. The computer pointing device of claim 29, wherein a bottom portion of the control stick is coupled to a computer mouse.

32. The computer pointing device of claim 29, wherein a height of the cap above an upper surface of the bottom support is approximately equal to or greater than a diameter of the cap.

33. The computer pointing device of claim 29, further comprising the cover filled with a deformable material.

34. The computer pointing device of claim 29, wherein the cap further comprises a plurality of wire supports located adjacent to the inner surface of the cover.

35. The computer pointing device of claim 34, wherein each of the plurality of wire supports comprises a first wire, a second wire, and a third wire encased in a flexible sleeve, wherein a first end of the first wire is adjacent to a second end of the cover, a second end of the first wire is adjacent to a first end of the second wire, and a second end of the second wire is adjacent to a first end of the third wire.

36. The computer pointing device of claim 35, wherein the first and second ends of the second wire are each located adjacent to one of the scores on the inner surface of the cover.

37. The computer pointing device of claim 35, wherein an upper surface of the bottom support comprises a plurality of holes, wherein each individual hole within the plurality of holes is adapted for receiving a portion of one of the plurality of wire supports that includes the third wire.

38. The computer pointing device of claim 34, wherein each of the plurality of wire supports comprises two wires encased in a flexible sleeve, wherein a first end of the first wire is adjacent to a second end of the cover, a second end of the first wire is adjacent to a first end of the second wire, and a second end of the second wire is pivotally mounted in the bottom support.

39. The computer pointing device of claim 34, wherein the cap further comprises a disc adjacent to an inner surface of a second end of the cover, and wherein an end of the plurality of wire supports is attached to a periphery of the disc.

40. The computer pointing device of claim 39, wherein an upper surface of the disc is concave.

41. The computer pointing device of claim 39, wherein the cap further comprises a spring attached to a lower surface of the disc.

42. The computer pointing device of claim 41, wherein an upper surface of the bottom support comprises a depression to accommodate a lower portion of the spring.

43. The computer pointing device of claim 42, wherein a depth of the depression can accommodate a length of the spring when the spring is compressed.

\* \* \* \* \*